US011465620B1

(12) United States Patent
Lukarski et al.

(10) Patent No.: US 11,465,620 B1
(45) Date of Patent: Oct. 11, 2022

(54) LANE GENERATION

(71) Applicant: Apple Inc., Cupertino, CA (US)

(72) Inventors: Dimitar H. Lukarski, Sunnyvale, CA (US); Siddharth Swaminathan, Sunnyvale, CA (US); Miroslav Baric, San Jose, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 16/902,816

(22) Filed: Jun. 16, 2020

Related U.S. Application Data

(60) Provisional application No. 62/874,680, filed on Jul. 16, 2019.

(51) Int. Cl.
*B60W 30/12* (2020.01)
*B60W 60/00* (2020.01)

(52) U.S. Cl.
CPC ........ *B60W 30/12* (2013.01); *B60W 60/0011* (2020.02); *B60W 60/00272* (2020.02); *B60W 2552/10* (2020.02); *B60W 2552/53* (2020.02); *B60W 2554/4044* (2020.02); *B60W 2554/4046* (2020.02)

(58) Field of Classification Search
CPC ............. B60W 30/12; B60W 60/0011; B60W 60/00272; B60W 2552/10; B60W 2552/53; B60W 2554/4044; B60W 2554/4046
See application file for complete search history.

(56) References Cited

U.S. PATENT DOCUMENTS

| 6,526,352 | B1 | 2/2003 | Breed et al. | |
|---|---|---|---|---|
| 7,979,172 | B2 | 7/2011 | Breed | |
| 8,000,897 | B2 | 8/2011 | Breed et al. | |
| 8,527,199 | B1 | 9/2013 | Burnette et al. | |
| 9,921,585 | B2 | 3/2018 | Ichikawa et al. | |
| 2008/0312832 | A1* | 12/2008 | Greene ................. | G08G 1/166 701/301 |

(Continued)

OTHER PUBLICATIONS

A.Huang, D. Moore, M. Antone et al. "Multi-Sensor Lane Finding in Urban Road Networks" in Robotics: Science and Systems IV pp. 1-6. MIT Press (Year: 2009).*

(Continued)

*Primary Examiner* — Peter D Nolan
*Assistant Examiner* — Tanya C Sienko
(74) *Attorney, Agent, or Firm* — Young Basile Hanlon & MacFarlane, P.C.

(57) ABSTRACT

A vehicle includes a lane generator that is configured to receive information that describes a first lane portion and a second lane portion and determine that a discontinuity is present. The lane generator obtains a sensor output and detects presence of a nearby vehicle in the first lane portion. A classification for the nearby vehicle is identified by analyzing the sensor output, and is used to select a vehicle kinematics model. The lane generator determines paths for a simulated vehicle from the first lane portion to the second lane portion using the vehicle kinematics model. A third lane portion is determined based on the paths such that the third lane portion defines a traversable route from the first lane portion to the second lane portion in accordance with the vehicle kinematics model. An automated vehicle control system generates control outputs based in part on the third lane portion.

21 Claims, 10 Drawing Sheets

(56) References Cited

U.S. PATENT DOCUMENTS

| | | | |
|---|---|---|---|
| 2013/0253815 A1* | 9/2013 | Orfila | G08G 1/166 |
| | | | 701/301 |
| 2018/0188059 A1 | 7/2018 | Wheeler et al. | |
| 2019/0286160 A1* | 9/2019 | Toda | G05D 1/0214 |
| 2019/0299987 A1* | 10/2019 | Toda | B60W 30/12 |
| 2020/0108833 A1* | 4/2020 | Sim | G01C 21/28 |
| 2020/0282997 A1* | 9/2020 | Ueda | B60W 10/18 |

OTHER PUBLICATIONS

L.Wang, .Wang, et al. "3D LIDAR based Branched Estimation and Intersection Location for Autonomous Vehicles" 2017 IEEE Intelligent Vehicles Symposium (IV) Jun. 11-14, 2017, Redondo Beach, CA, USA (Year: 2017).*

Zou, Q., et al., "Robust Lane Detection From Continuous Driving Scenes Using Deep Neural Networks", IEEE TVT, Sep. 2018 (12 pp).

Jiang, K., et al., "A Flexible Multi-Layer Map Model Designed for Lane-Level Route Planning in Autonomous Vehicles", Elsevier, Engineering 5 (2019), Revised May 20, 2018 (14 pp).

* cited by examiner

LANE GENERATION

CROSS-REFERENCE TO RELATED APPLICATIONS

This application claims the benefit of U.S. Provisional Application No. 62/874,680, filed on Jul. 16, 2019, the content of which is hereby incorporated by reference in its entirety for all purposes.

TECHNICAL FIELD

This disclosure relates to lane generation for mapping and vehicle control.

BACKGROUND

Maps may include information that describe where the lanes of roads, bicycle paths, or pedestrian paths are located. In some locations, such as at intersections and driveways, lanes are not explicitly designated by pavement markings or physical features. In these locations, the spatial extents of lanes may be ambiguous.

SUMMARY

One aspect of the disclosure is a vehicle that includes an automated vehicle control system, a sensor, and a lane generator that is configured to receive information that describes a first lane portion and a second lane portion and determine that a discontinuity is present between the first lane portion and the second lane portion. The lane generator is further configured to obtain a sensor output from the sensor, detect presence of a nearby vehicle in the first lane portion using the sensor output, identify a classification for the nearby vehicle by analyzing the sensor output, and select a vehicle kinematics model for the nearby vehicle in accordance with the classification. The lane generator is further configured to determine one or more paths for a simulated vehicle from the first lane portion to the second lane portion using the vehicle kinematics model, and determine a third lane portion based on the one or more paths from the first lane portion to the second lane portion such that the third lane portion defines a traversable route from the first lane portion to the second lane portion in accordance with the vehicle kinematics model. The automated vehicle control system is configured to generate control outputs based in part on the third lane portion.

In some implementations, the information that describes the first lane portion and the second lane portion is received from stored mapping information. In some implementations, the information that describes the first lane portion and the second lane portion is received by determining boundaries for the first lane portion and the second lane portion based on sensor outputs.

The discontinuity may be in an intersection that is located between the first lane portion and the second lane portion, and the third lane portion represents a travel path through the intersection.

Determining the one or more paths may comprise complying with a set of constraints. Determining the third lane portion may include determining a vehicle area occupied by a simulated vehicle at multiple steps along each of the one or more paths and combining the vehicle areas for the multiple time steps. Determining the third lane portion may comprise complying with a first positional constraint relative to the first lane portion and complying with a second positional constraint relative to the second lane portion.

In some implementations of the vehicle, the lane generator is further configured to determine regulatory information for at least one of the first lane portion or the second lane portion, and determine connectivity between the first lane portion and the second lane portion using the regulatory information.

Another aspect of the disclosure is a method that includes receiving information that describes a first lane portion and a second lane portion, determining that a discontinuity is present between the first lane portion and the second lane portion, determining one or more paths for a simulated vehicle from the first lane portion to the second lane portion using a vehicle kinematics model for the simulated vehicle, and determining a third lane portion based on the one or more paths from the first lane portion to the second lane portion such that the third lane portion defines a traversable route from the first lane portion to the second lane portion in accordance with the vehicle kinematics model.

In some implementations, the information that describes the first lane portion and the second lane portion is received from stored mapping information. In some implementations, the information that describes the first lane portion and the second lane portion is received by determining boundaries for the first lane portion and the second lane portion based on sensor outputs.

The discontinuity may be in an intersection that is located between the first lane portion and the second lane portion, and the third lane portion represents a travel path through the intersection.

Some implementations of the method also include identifying a classification for a nearby vehicle and selecting the vehicle kinematics model for the simulated vehicle in accordance with the classification. Identifying the classification for the nearby vehicle may include obtaining a sensor output, detecting presence of the nearby vehicle in the first lane portion using the sensor output, and analyzing the sensor output to determine the classification for the nearby vehicle.

In some implementations, determining the one or more paths is performed in accordance with a set of constraints. In some implementations, determining the third lane portion includes determining a vehicle area occupied by the simulated vehicle at multiple steps along each of the one or more paths and combining the vehicle areas for the multiple time steps.

Determining the third lane portion may comprise complying with a first positional constraint relative to the first lane portion and complying with a second positional constraint relative to the second lane portion.

Some implementations of the method also include determining regulatory information for at least one of the first lane portion or the second lane portion, and determining connectivity between the first lane portion and the second lane portion using the regulatory information.

Another aspect of the disclosure is a method that includes receiving information that describes a first lane portion and a second lane portion, determining that a discontinuity is present between the first lane portion and the second lane portion, obtaining a sensor output from a sensor, detecting presence of a nearby vehicle in the first lane portion using the sensor output, identifying a classification for the nearby vehicle by analyzing the sensor output, selecting a vehicle kinematics model for the nearby vehicle in accordance with the classification, determining one or more paths for a simulated vehicle from the first lane portion to the second lane portion using the vehicle kinematics model, determining a third lane portion based on the one or more paths from the first lane portion to the second lane portion such that the third lane portion defines a traversable route from the first lane portion to the second lane portion in accordance with the vehicle kinematics model, and generating control outputs for an automated vehicle control system based in part on the third lane portion.

In some implementations of the method, the information that describes the first lane portion and the second lane portion is received from stored mapping information. In some implementations of the method, the information that describes the first lane portion and the second lane portion is received by determining boundaries for the first lane portion and the second lane portion based on sensor outputs.

The discontinuity may be in an intersection that is located between the first lane portion and the second lane portion, and the third lane portion represents a travel path through the intersection.

In some implementations of the method, determining the one or more paths comprises complying with a set of constraints. In some implementations of the method, determining the third lane portion includes determining a vehicle area occupied by a simulated vehicle at multiple steps along each of the one or more paths and combining the vehicle areas for the multiple time steps.

Determining the third lane portion may comprise complying with a first positional constraint relative to the first lane portion and complying with a second positional constraint relative to the second lane portion.

Some implementations of the method also include determining regulatory information for at least one of the first lane portion or the second lane portion, and determining connectivity between the first lane portion and the second lane portion using the regulatory information.

DETAILED DESCRIPTION

Automated control systems for vehicles typically use information describing the spatial extents of travel lanes on roadways. This information may be obtained from mapping data, may be determined in real-time using machine vision techniques, or may be determined using a combination of these and/or other techniques.

There are locations where the spatial extents of travel lanes are ambiguous. Examples include intersections and parking lots. In these locations, information describing the spatial extents of travel lanes may not be included in mapping data. In addition, existing machine vision techniques that are dependent on the locations of visible features that indicate the spatial extents of travel lanes (e.g., pavement markings) may not be able to function because visible features are not present in these areas.

The systems and methods that are described herein define spatial extents for auxiliary lanes in locations where there are discontinuities between segments of travel lanes that are indicated by pavement marking or physical features such as curb lines. Auxiliary lanes are defined by boundaries, which may be in the form of polylines defined in a coordinate space (e.g., cartesian coordinates). The auxiliary lanes are generated using a vehicle kinematics model, which ensures that the auxiliary lanes are drivable.

Figure 1:
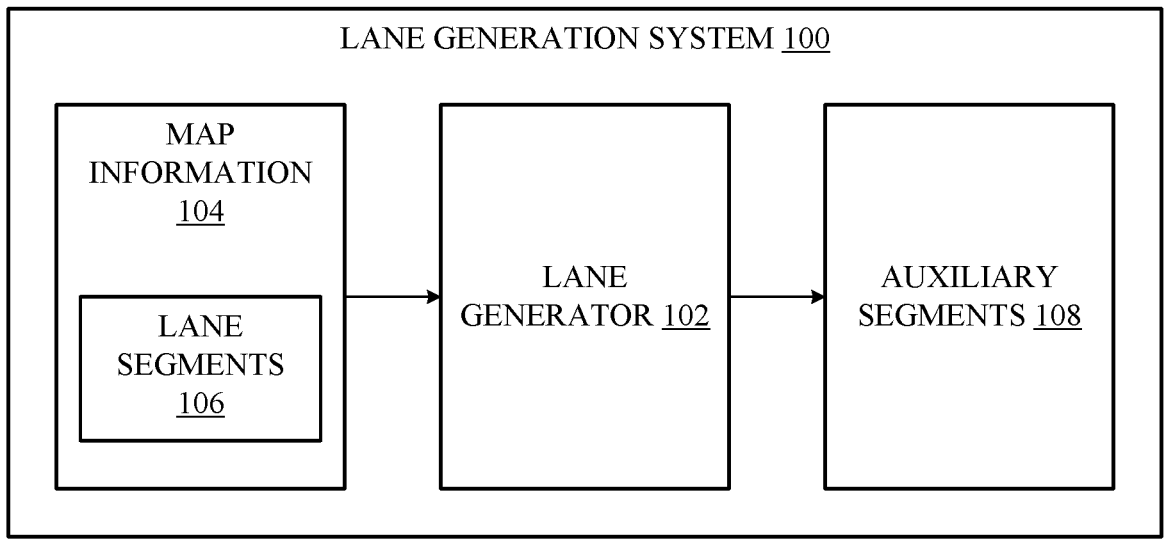
FIG. 1 is a block diagram of a lane generation system.

FIG. 1 is a block diagram of a lane generation system 100. The lane generation system 100 includes a lane generator 102 that receives map information 104 that includes lane segments 106 as an input and generates auxiliary segments 108 (which may also be referred to as auxiliary lane segments) as an output. The lane generation system 100 may be implemented, in part or in whole, using one or more computing devices. As an example, suitable computing devices for use in implementing the lane generation system 100 can include a memory, a processor, and program instructions that are stored in the memory and cause the processor to perform actions when executed. The lane generation system 100 can be implemented using a single computing device or using multiple computing devices that communication by sending and receiving information using wired or wireless communications systems.

The lane generator 102 of the lane generation system 100 receives the map information 104 as an input. The map information 104 includes map elements, which are collections of information that describe features of an environment, such as geographic features. The map elements of the map information 104 include the lane segments 106, which are lane-level representations of a transportation network. The lane segments 106 describe portions (i.e., lane portions) of a transportation network, which may include roadways (e.g., motorized transportation facilities) and pathways (e.g., non-motorized transportation facilities).

Each of the lane segments 106 represents part of a lane of a transportation facility. Attributes may be included in each of the lane segments 106 to describe characteristics of the corresponding portion of the transportation network. Attributes of the lane segments 106 can include location, directionality, and connections to other ones of the lane segments 106.

As an example, the spatial extents of each of the lane segments 106 can be described geometrically. Features such as such as lines, curves, polylines, and/or polygons can be used to describe the lane segments 106. As one example, the lane segments 106 can be described geometrically as bounded areas that extend from a beginning point to an ending point along a direction of travel. The spatial extents of the lane segments 106 can be expressed in a coordinate system, such as latitude, longitude, and elevation. The directionality of each of the lane segments 106 indicate its permitted direction of travel. Connectivity to other ones of the lane segments 106 can be described for each of the lane segments 106, by unique identification codes that indicate the adjacent ones of the lane segments 106. Connectivity means that there is a legal and traversable connection between a pair of the lane segments 106.

Other features can be represented in the map information 104. As one example, the map information may include map elements that describe various features of the environment, such as traffic signals, traffic signs, other regulatory information (e.g., lane use controls), parking locations, buildings, business locations, points of interest, etc. As another example, the map information 104 may include information that can be used by navigation routing systems to determine how to travel between locations that are represented in the map information 104. Some of these other features may be used by the lane generation system 100 as a basis for determining the lane segments.

The lane generation system 100 uses the geometric configurations of the lane segments 106 and metadata describing the lane segments 106 to generate the auxiliary segments 108. The auxiliary segments 108 are segments that are defined in gaps between the lane segments 106 from the map information 104, and represent areas that can be traversed by vehicles while traveling between the lane segments 106 that are separated by gaps. In addition, the auxiliary segments 108 are determined in a manner that ensures that vehicles will be able to complete the corresponding movements (e.g., turning movements between the lane segments 106 in an intersection) successfully, and will not fail to execute the movements, for example, because the required motion exceeds the dynamic limits of the vehicle. As will be described herein, the boundaries of the lane segments 106 and the auxiliary segments 108 may be used as constraints in a motion planning operation of an automated vehicle control system.

Determination of the auxiliary segments 108 by the lane generator 102 of the lane generation system 100 will be described further herein. In an example implementation, the lane generation system 100 may receive information that describes a first lane portion and a second lane portion. The first and second lane portions may be individual ones of the lane segments 106 from the map information 104. The lane generation system 100 determines that a discontinuity exists between the first and second lane portions, for example, based on the fact that a traversable relationship exists between the two lane portions and their respect ends are not connected to any lane segments and are spaced from each other. In accordance with the determination that a discontinuity exists, the lane generation system 100 may determine a third lane portion (e.g., one of the auxiliary segments 108) that connects that first lane portion to the second lane portion. The third lane portion may be determined by the lane generator 102 using a vehicle kinematics model and, optionally, additional constraints, such that resulting geometric configuration of the third lane portion defines an area that is traversable by a vehicle.

Figure 2:
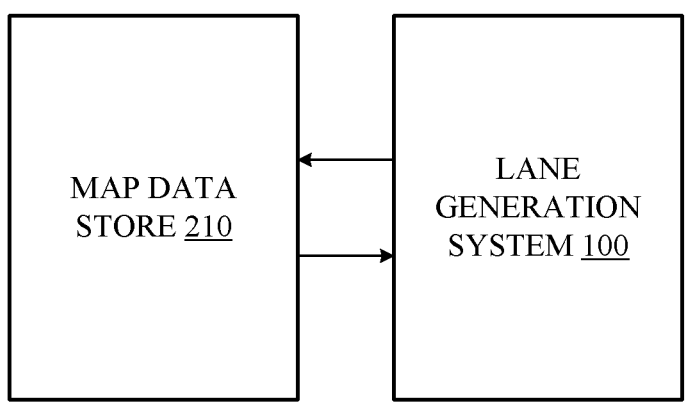
FIG. 2 is a block diagram that shows a first implementation in which the lane generation system is used to process stored map data.

FIG. 2 is a block diagram that shows a first implementation in which the lane generation system 100 is used to process stored map data from a map data store 210. The map data store 210 is storage system that stores the map information 104. The lane generation system 100 accesses the map information 104 from the map data store 210 and processes the lane segments 106 to identify discontinuities. Upon determining that a discontinuity exists, the lane generation system 100 generates one of the auxiliary segments 108 corresponding to the discontinuity. The auxiliary segment 108 that is generated by the lane generation system 100 is then added to the map information 104 and stored in the map data store 210 for future use. As an example, the implementation shown in FIG. 2 may be used for off-line processing of the map information 104 to supplement the map information with the auxiliary segments 108 for later use, such as by an automated control system of a vehicle.

Figure 3:
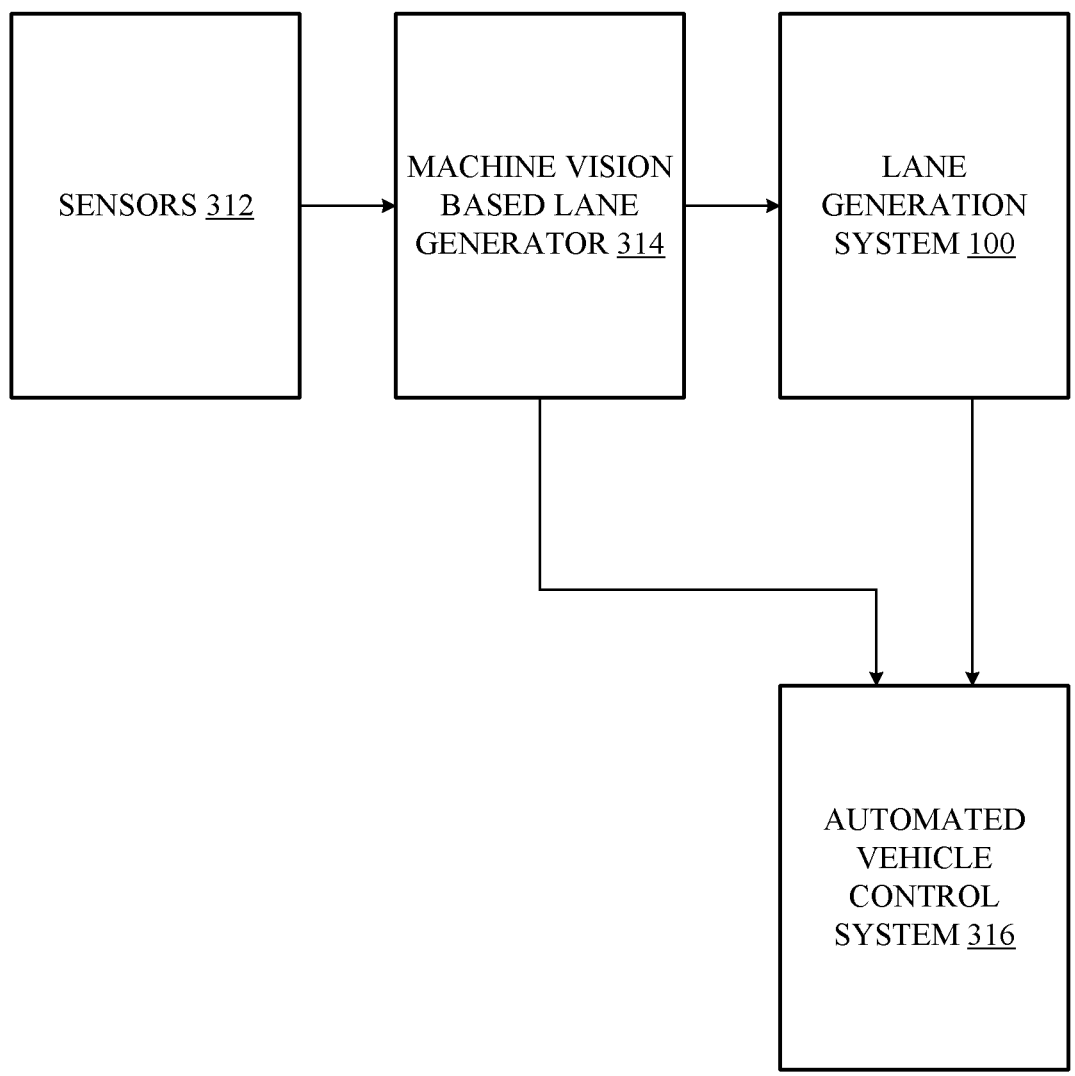
FIG. 3 is a block diagram that shows a second implementation in which the lane generation system is used to process lane segments that are output by a machine vision based lane generator.

FIG. 3 is a block diagram that shows a second implementation in which the lane generation system 100 is used to process lane segments that are output by a machine vision based lane generator 314 using information that is obtained from sensors 312. This implementation is intended for real-time use. As an example, the lane generation system 100 may be incorporated in a road-going vehicle and used to generate the auxiliary segments 108 in real time according to this implementation.

The sensors 312 are devices that are able to output signals that represent characteristics of the surrounding environment. As one example, the sensors 312 may include still or video cameras that are configured to collect images of the surrounding environment. The still or video cameras may include either or both of visible spectrum cameras and/or infrared spectrum cameras. As another example, the sensors 312 may include devices that are configured to determine the locations of objects in three-dimensional spaces, such as LIDAR sensors, imaging radars, and/or structured light sensors. Other types of devices having different sensing modalities may be included in the sensors 312.

The information output by the sensors 312 is used by the machine vision based lane generator 314 as an input. The machine vision based lane generator 314 is configured to determine the lane segments 106 in real time based on features in the surrounding environment, which are identified using the output signals that are generated by the sensors 312. Examples of these features include pavement markings and curb lines. The features from the surrounding environment may be identified using known machine vision techniques, such as by using a trained deep neural network that is configured to identify the locations, extents, and types of pavement markings (e.g., lane lines) that are located on a roadway. Thus, the machine vision based lane generator 314 may use the information provided by the sensors 312 to identify features in a surrounding environment that represent the spatial extents of travel lanes. The spatial locations of the features from the surrounding environment are used to establish spatial extents (e.g., boundary lines) for the lane segments 106.

The machine vision based lane generator 314 may also be configured to determine metadata describing the lane segments 106 that it generates, such as by interpreting pavement markings that indicate a requirement to come to a stop, by interpreting pavement marking that indicate a turning movement restriction (e.g., arrows), or by interpreting signs or other traffic control devices that convey information that is relevant to the lane segments 106 (e.g., for use in determining connectivity between a first lane segment and a second lane segment).

The lane generation system 100 processes the lane segments 106 that are generated by the machine vision based lane generator to identify discontinuities. Upon determining that a discontinuity exists, the lane generation system 100 generates one of the auxiliary segments 108 corresponding to the discontinuity.

The lane segments 106 that are generated by the machine vision based lane generator 314 and the auxiliary segments 108 that are generated by the lane generation system 100 are provided to an automated vehicle control system 316 as inputs. The automated vehicle control system 316 may control operation of vehicle actuators, such as propulsion actuators, braking actuators, steering actuator, and suspension actuators, to control movement of a vehicle from an origin location toward a destination. The lane segments 106 and the auxiliary segments 108 may be used by the automated vehicle control system 316 as constraints used when setting a path for the vehicle. The automated vehicle control system 316 may then output commands to the actuators to cause the actuators to cause motion of the vehicle in accordance with the path. As one example, the automated vehicle control system 316 may output a propulsion command that causes the vehicle to move forward at a specified speed along one of the lane segments 106 or one of the auxiliary segments 108. As another example, the automated vehicle control system 316 may output a steering command that causes the vehicle to set a steering angle determined to center the vehicle laterally within one of the lane segments 106 or one of the auxiliary segments 108.

Figure 4:
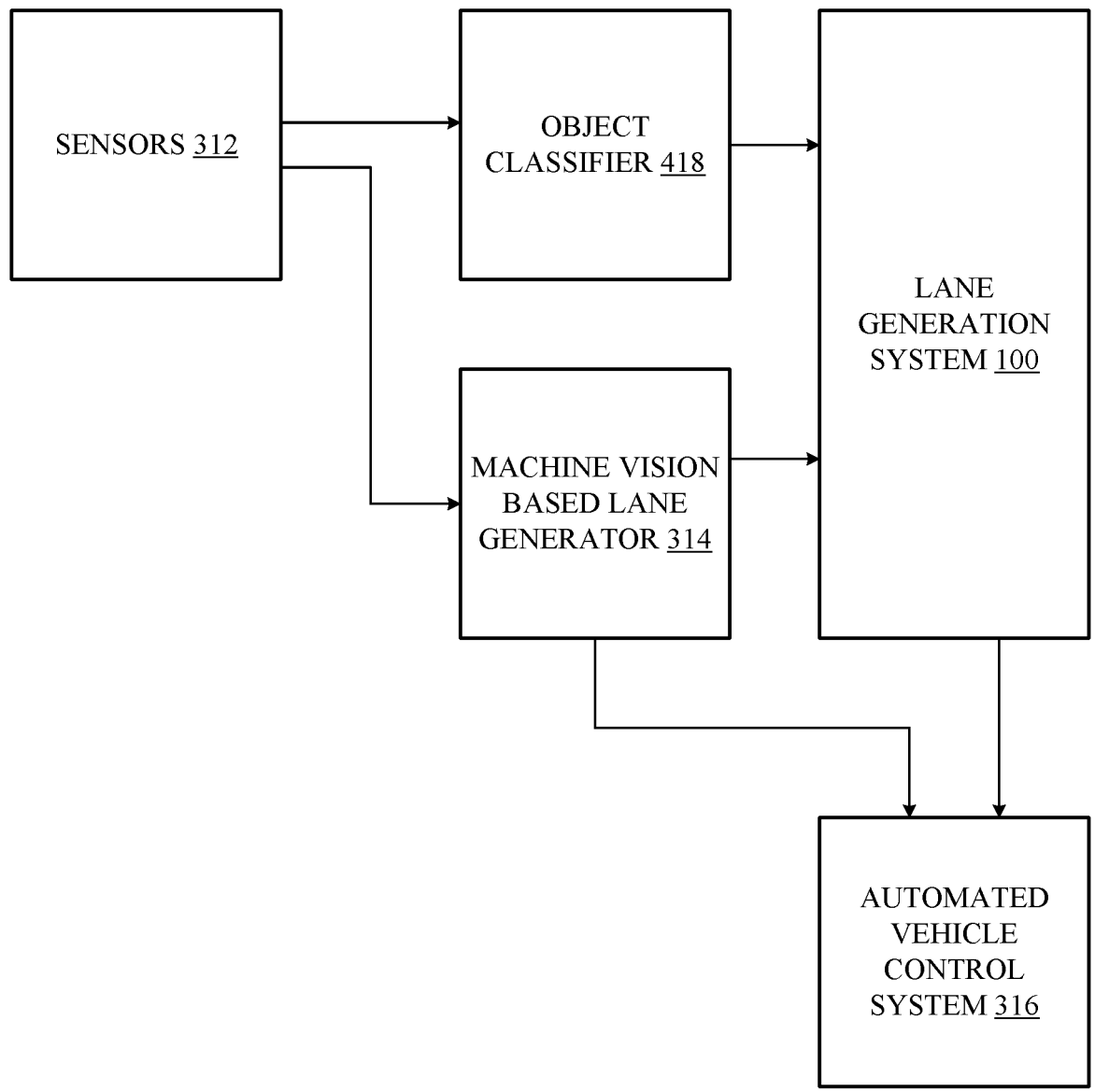
FIG. 4 is a block diagram that shows a third implementation in which the lane generation system is used to process lane segments that are output by a machine vision based lane generator using object classification information output by an object classifier.

FIG. 4 is a block diagram that shows a third implementation in which the lane generation system 100 is used to process lane segments that are output by the machine vision based lane generator 314 using information that is obtained from the sensors 312 and is also configured to use object classification information that is output by an object classifier 418 using the information that is obtained from the sensors 312. The sensors 312, the machine vision based lane generator 314, and the automated vehicle control system 316 are as previously described. This implementation is intended for real-time use, and generates some of the auxiliary segments 108 such that they represent expected paths for vehicles that are present in the surrounding environment. As an example, the lane generation system 100 may be incorporated in a road-going vehicle and used to generate the auxiliary segments 108 in accordance with the types of nearby vehicles in real time according to this implementation.

The object classifier 418 uses machine vision based techniques to identify the presence of objects, such as vehicles, in the surrounding environment. The object classifier is further configured, using machine vision based techniques, to determine classification information that describes the type of object that has been identified. The object classifier 418 uses output signals from the sensors 312 as inputs, such as a still image or a sequence of video frames. With respect to objects that are vehicles, the object classification information describes the type of vehicle. As one example, a classification scheme may be used that assigns vehicles to categories, such as small car, large car, light truck, heavy truck, etc. As another example, a specific make and model for the vehicles in the surrounding environment may be determined.

The categories, make and model designations, or other classification information that are output by the object classifier 418 are used to select a vehicle kinematics model according to the classification. The vehicle kinematics model is an estimate that describes how the vehicles of a certain classification are able to move. The vehicle kinematics model is provided to the lane generation system 100 for use in generating the auxiliary lanes. In particular, for vehicles that are positioned in lane segments 106 that terminate at discontinuities, the vehicle kinematics model is used to estimate how the vehicle will move as it travels across the discontinuity to the next one of the lane segments 106, and this estimate is used as a basis for determining the auxiliary segments 108 in accordance with the dynamic capabilities of the vehicles that are expected to use them. When the vehicle continues on and a different vehicle approaches the discontinuity, the process may be repeated to generate a new one of the auxiliary segments 108 in accordance with the classification information for the different vehicle.

In this example, the lane generation system 100 is used to generate the auxiliary segments 108 in real-time, and may be implemented in a vehicle that is travelling on the roadway network. Some of the auxiliary segments 108 that are generated by lane generation system 100 will be auxiliary segments 108 that are intended to be traversed by the vehicle that the lane generation system 100 is present in. For these segments, a known classification or vehicle kinematics model may be used to determine the geometry of the auxiliary segment 108.

Figure 5:
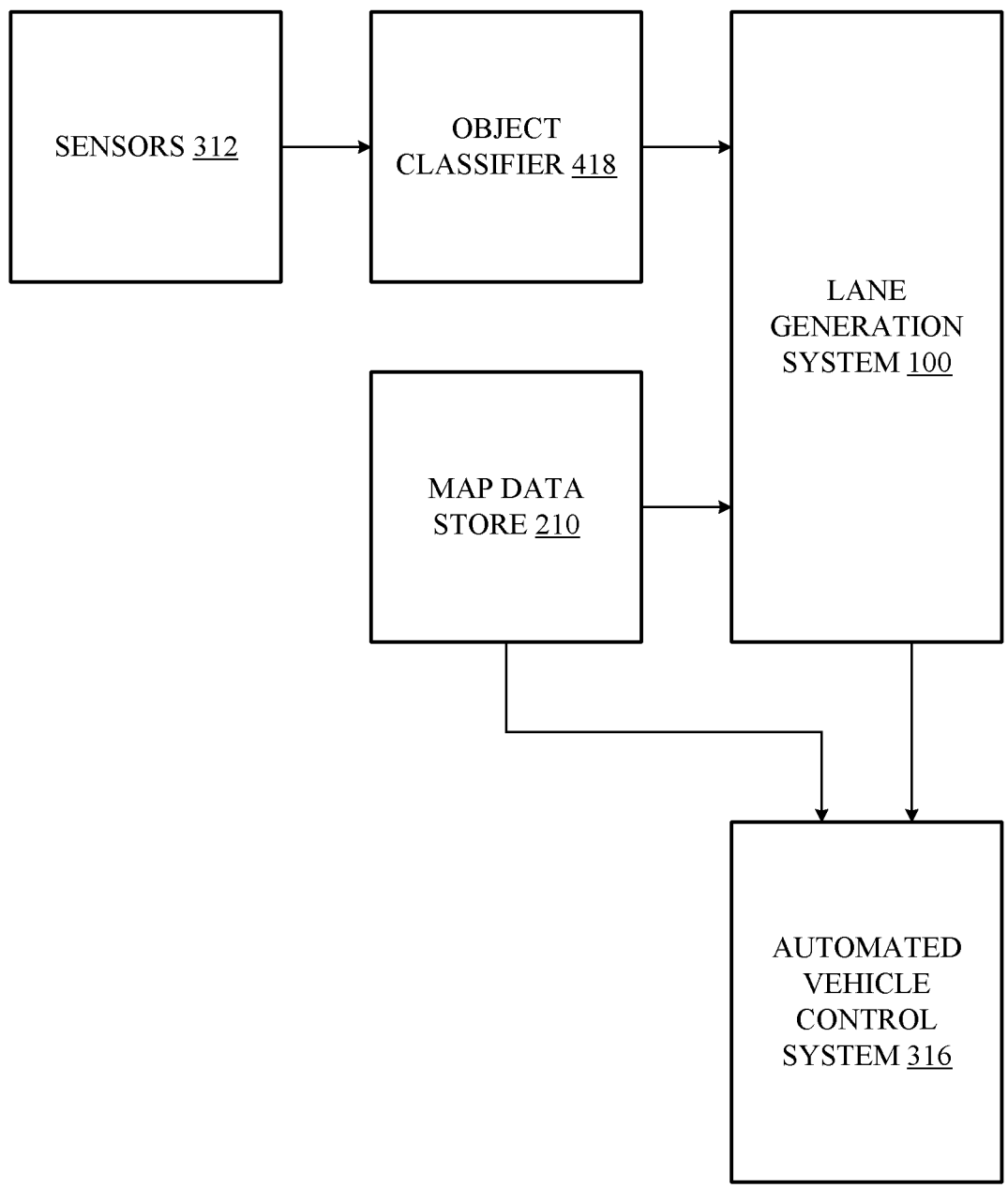
FIG. 5 is a block diagram that shows a fourth implementation in which the lane generation system is used to process stored map data using object classification information output by an object classifier.

FIG. 5 is a block diagram that shows a fourth implementation in which the lane generation system 100 is used to process stored map data from the map data store 210 using object classification information output by the object classifier 418 using information that is output by the sensors 312. The map data store 210, the sensors 312, the automated vehicle control system 316, and the object classifier 418 are as previously described. This implementation is intended for real-time use, and generates some of the auxiliary segments 108 such that they represent expected paths for vehicles that are present in the surrounding environment. As an example, the lane generation system 100 may be incorporated in a road-going vehicle and used to generate the auxiliary segments 108 in accordance with the types of nearby vehicles in real time according to this implementation.

The lane generation system 100 accesses the map information 104 from the map data store 210 and processes the lane segments 106 to identify discontinuities. Upon determining that a discontinuity exists, the lane generation system 100 generates one of the auxiliary segments 108 corresponding to the discontinuity. In addition to using the locations and extents of the lane segments 106 to determine the locations and extents of the auxiliary segments 108, the lane generation system 100 uses the object classification information that is output by the object classifier 418 to generate the auxiliary segments 108 by use of a vehicle kinematics model that is selected based on the object classification information, as previously described.

The auxiliary segment 108 that is generated by the lane generation system 100 is provided to the automated vehicle control system 316 and is used as a basis for controlling operation of the vehicle, as previously described. The auxiliary segment 108 that is generated by the lane generation system 100 may also be added to the map information 104 and stored in the map data store 210 for future use.

Figure 6:
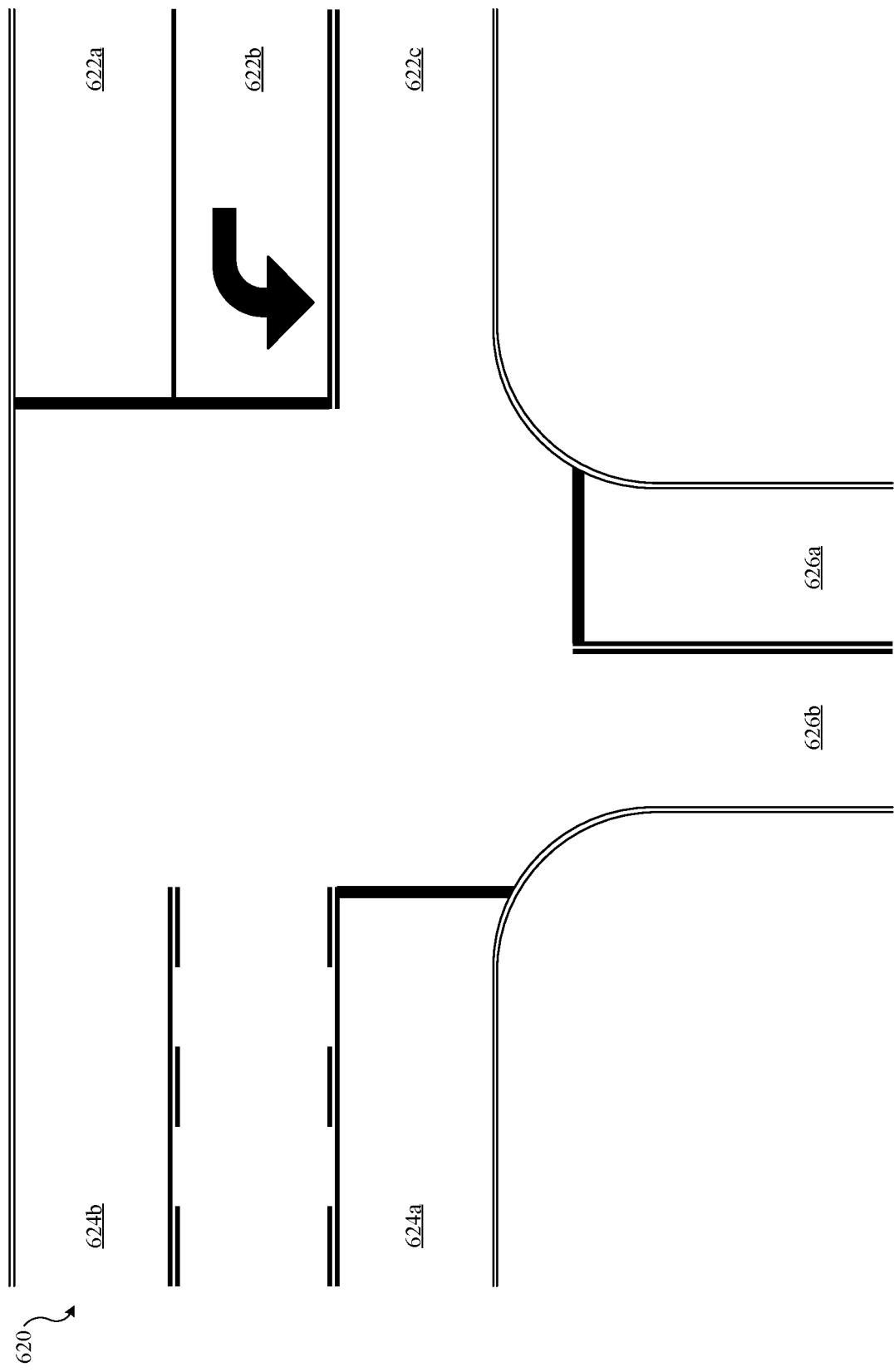
FIG. 6 is an illustration that shows a portion of a roadway that can be processed by the lane generation system.
Figure 7:
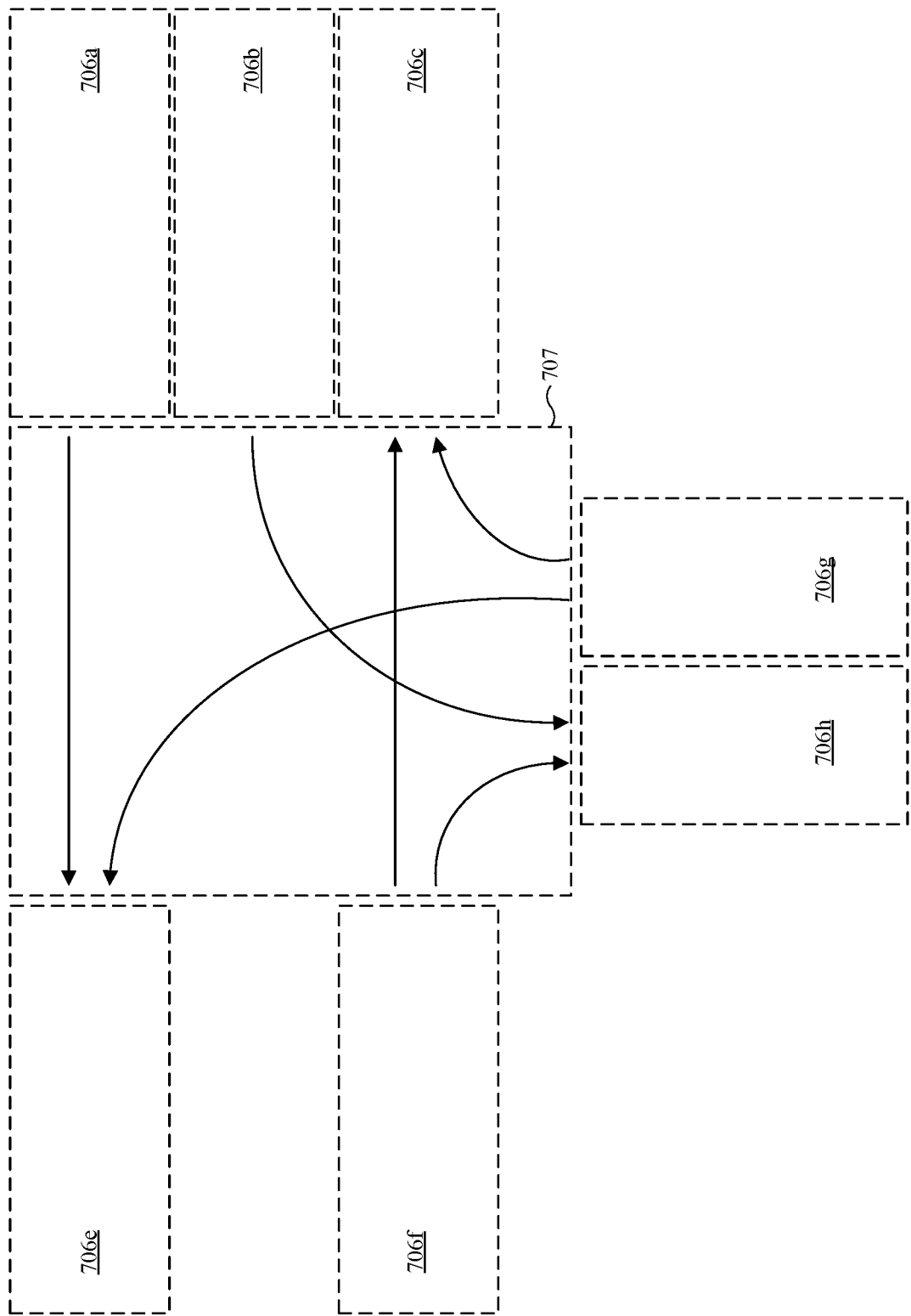
FIG. 7 is an illustration that shows lane segments that are defined in correspondence to the lanes of the roadway.
Figure 8:
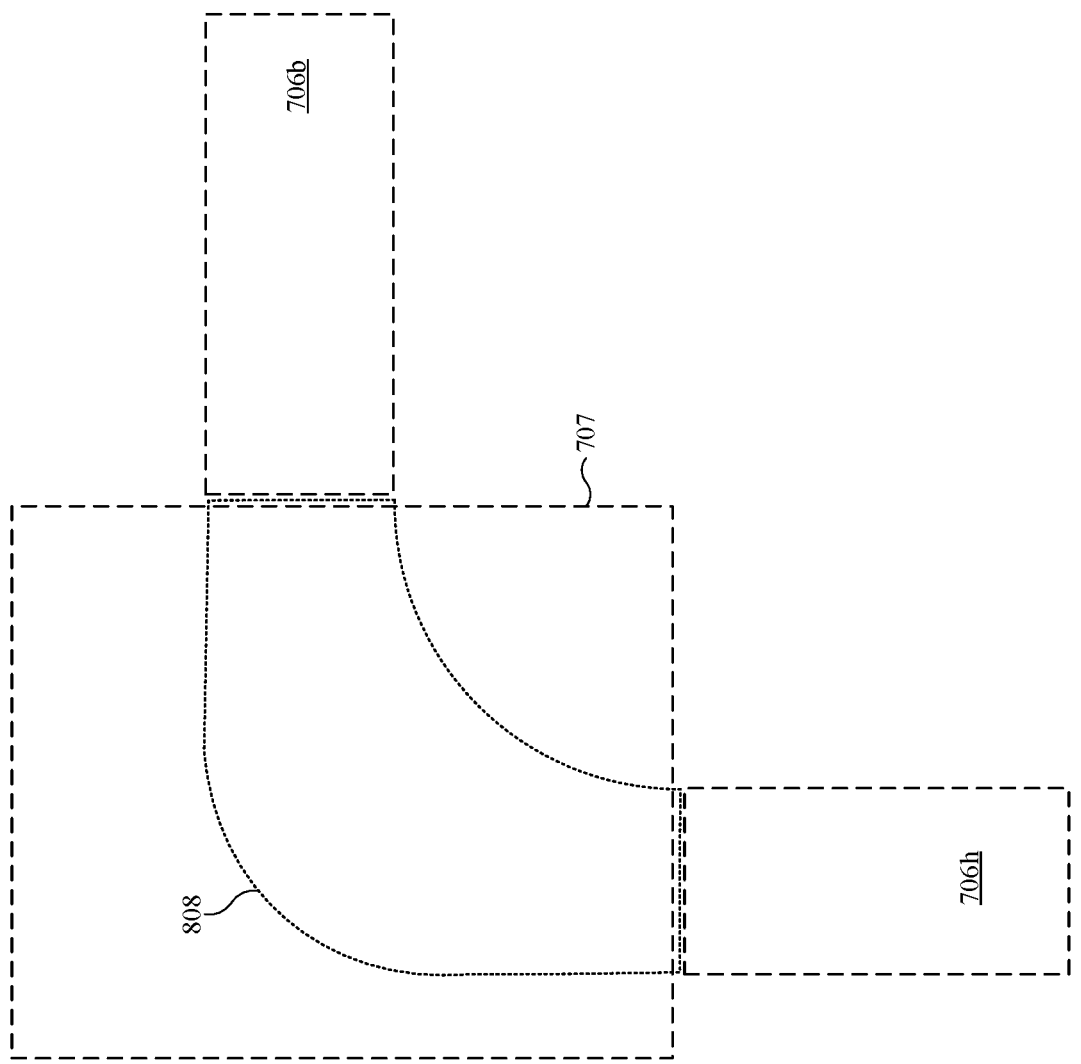
FIG. 8 is an illustration that shows an auxiliary segment that is defined between a pair of the lane segments.

Operation of the lane generation system 100 will be explained with reference to a specific example as shown in FIGS. 6-8. Generally stated, the lane generation system 100 uses vehicle dynamics properties as represented by the vehicle kinematics model and used the beginning and ending locations of the lane segments 106, which generally correspond to travel lanes that are indicated on a roadway using pavement markings. The process used by the lane generation system include two main parts. In the first part, connectivity between lane segments is determined at a location where a discontinuity exists. In the second part, the geometry of an auxiliary lane is determined between the lane segments that have continuity with respect to each other.

FIG. 6 is an illustration that shows a portion of a roadway 620 that can be processed by the lane generation system 100. The roadway 620 includes an intersection where two roads meet. In the illustrated example, the intersection is a T-intersection that includes three legs that each include one or more approach legs and one or more receiving lanes. The first and second legs are opposite one another, and the third leg meets the first and second legs at an angle, which is approximately ninety degrees in the illustrated example. The first leg includes a first approach lane 622a that allows straight through movements only, a second approach lane 622b that allows left turns only, and a receiving lane 622c. The second leg includes a first approach lane 624a that allows through and right turn movements, and a receiving lane 624b. The third leg includes a first approach lane 626a that allows left and right turn movements, and a receiving lane 626b.

FIG. 7 is an illustration that shows lane segments 706a-706h that are defined in correspondence to the lanes of the roadway 620. A discontinuity 707 is located in the intersection area of the roadway 620, and corresponds to an area in which there is no explicit information describing lane geometry for use when travelling through the intersection area of the roadway 620. Arrows show legally permissible movements by which vehicular traffic may travel between pairs of the lane segments 706a-706h. The term "legally permissible movements" refers to those movements (typically one of a left turn, a right turn, or a straight through movement) that may be performed by a vehicle to travel from one of the lane segments 706a-706h to another one of the lane segments 706a-706h in accordance with applicable laws and regulations. In the illustrated example, the lane segment 706b is subject to a left turn only regulation, and the only legally permissible movement is from the lane segment 706b is a left turn to the lane segment 706h.

Connectivity between lane segments via the legally permissible movements can be determined using data from multiple sources. Sources of data include roadway geometry (e.g., relative angles between lanes), street signs, the numbers of approach lanes and receiving lanes at an intersection, neighboring lanes and their features, the direction of travel, records describing previous vehicle trips at a location, sensor outputs showing movement of other vehicles at a location, and/or manual data annotation by a person. These features can be used in a decision making model of any suitable type, such as a rules-based model or a trained machine learning model.

In some implementations, the legally permissible movements are predetermined, for example. For example, legally permissible movements may be encoded in the map information 104 for each of the lane segments 106 by listing all of the other ones of the lane segments 106 to which travel is permitted. In such an implementation the lane generation system 100 may be configured to determine the legally permissible movements by accessing information describing the legally permissible movements from the map information 104.

As another example, the map information 104 may include information describing regulations that the lane segments are subject to, such as turn restrictions, in the map information 104. In such an implementation, the legally permissible movements are determined by the lane generation system 100 by first identifying a discontinuity where the end of an approach lane segment is not connected to the end of a receiving lane segment. Next, for each approach lane segment, all receiving lane segments adjacent to the discontinuity are identified. Movements between each approach lane segment and all of the receiving lane segments adjacent to the discontinuity are identified as legally permissible routes unless they are excluded. Movements between approach lane segments and legally permissible routes may be excluded based on the turn restrictions or other regulations that the lane segments are subject to.

As another example, legally permissible movements are determined in real time. In such an implementation, the legally permissible movements are determined by the lane generation system 100 by first identifying a discontinuity where the end of an approach lane segment is not connected to the end of a receiving lane segment. Next, for each approach lane segment, all receiving lane segments adjacent to the discontinuity are identified. Movements between each approach lane segment and all of the receiving lane segments adjacent to the discontinuity are identified as legally permissible routes unless they are excluded. Observations made by sensors, such as the sensors 312, are utilized to identify restrictions that exclude routes as legally permissible routes. As an example, the sensors 312 may obtain images that, when interpreted, are determined to include regulatory signs that impose a lane use control regulation on one of the approach lanes. Other techniques may be used to infer whether particular routes through a discontinuity should be excluded as legally permissible routes.

FIG. 8 is an illustration that shows an auxiliary segment 808 that is defined between a pair of the lane segments 706a-706h. The auxiliary segment 808 is defined between the terminal end of an approach lane that is represented by one of the lane segments 706a-706h, and an origin end of a receiving lane that is represented by one of the lane segments 706a-706h. In the illustrated example, the auxiliary segment is defined between a terminal end of the lane segment 706b, which is an approach lane that corresponds to the second approach lane 622b of the roadway 620, and an origin end of the lane segment 706h, which is a receiving lane that corresponds to the receiving lane 626b of the roadway 620.

The boundaries of the auxiliary segment 808 may be determined by generating one or more paths from an origin lane segment, such as the lane segment 706b in the current example, to a target lane segment, such as the lane segment 706h in the current example. The one or more paths may be determined such that they are drivable according to a vehicle kinematics model that is selected for an assumed vehicle, as previously described. Using the one or more paths, the boundaries of the auxiliary segment 808 are then determined by combining the areas occupied by a spatial footprint of the vehicle (e.g., a rectangle having a length and width corresponding to an example vehicle size) as the vehicle moves along the one or more paths from the origin lane segment to the target lane segment.

In one implementation, paths from the origin lane segment to the target lane segment may be generated according to a finite horizon optimal control problem as follows:

$$\min_u \sum_{i=0}^{N} l_{i(x_i, u_i)} + l_N(x_N)$$

In the foregoing equation, N represents a finite planning horizon, which may be expressed as a number of steps. The term $u_i$ represents a control vector (e.g., control inputs) at step i and the term $x_i$ represents a vehicle state at step i. The term u represent the sequence of control inputs, e.g., $u=(u_0, u_i, \ldots, u_N)$, that generate the desired vehicle motion to cause the vehicle to follow the path from the origin lane segment to the destination lane segment. The terms $l_i$ and $l_N$ are cost functions for a current step and final step. The cost functions are used to promote certain vehicle behaviors, such as minimizing total distance, and to penalize certain vehicle behaviors, such as high acceleration values.

At each time step, the state of the vehicle is updated according to:

$$x_{i+1} = f(x_i, u_i)$$

In the foregoing equation, the term $f(x_i, u_i)$ represents the vehicle kinematics model, by which the state of the vehicle at the next time step is determined based on the current state of the vehicle and the control inputs at the current step. Thus, vehicle kinematics model describes how control inputs change the states of the vehicle. The vehicle kinematics model may be based on a bicycle model of vehicle dynamics, or a more complex model may be used. The vehicle kinematics model includes parameters that are specific to the type of vehicle being modeled, such as maximum actuator forces and maximum acceleration values (e.g., a maximum lateral acceleration value). The control vector $u_i$ and the vehicle state $x_i$ are subject to constraints that are included in the vehicle kinematics model in order to ensure that the path is drivable by the assumed vehicle. The control vector $u_i$ and the vehicle state $x_i$ are also subject to additional constraints. As one example, the starting location of the vehicle must be within the origin lane segment and the ending location of the vehicle must be within the destination lane segment. As another example of constraints placed on the control vector $u_i$ and the vehicle state $x_i$, the footprint of the vehicle may not cross the side boundaries of the origin lane or the destination lane.

Using the path generated by solving the finite horizon optimal control problem (or using a path generated by another method), a template representing the footprint of the assumed vehicle (e.g., width and length of the vehicle from a top-down perspective) is applied to the positions along the path that were determined at each time step. Combining these areas results in the auxiliary segment 808. Additional iterations of path generation can be performed to add to the auxiliary segment 808 and ensure that a majority of the likely vehicle trajectories are included within the area bounded by the auxiliary segment 808. As one example, the starting and ending locations of the vehicle can be selected randomly for each of multiple iterations of path generation. As another example, the cost functions used in path generation can be changed for each of multiple iterations of path generation. As another example, the vehicle kinematics model can be changed for each of multiple iterations of path generation.

As previously described, the lane generation system 100 may use regulatory information to infer connectivity between pairs of the lane segments 106. In a similar manner, the auxiliary segments may be annotated by the lane generation system based on regulatory information. The regulatory information applied to the lane generation system 100 may be static or dynamic. As an example of a static regulatory condition, one of the auxiliary segments 108 may be coded as required to yield to conflicting traffic at all times, for example, at a stop-controlled intersection. As an example of a dynamic regulatory condition, one of the auxiliary segments 108 may be coded as required to comply with the state of a dynamic traffic control device, such as a traffic signal, and this coding may include vehicle directives that change dependent on the stated of the traffic control device, such as by indicating that the vehicle must yield while turning during a green indication of a traffic signal and must stop during a red indication of a traffic signal. Thus, in some implementations, the lane generation system 100 may determine connectivity between a first lane segment and a second lane segment based on regulatory information, by determining the regulatory information for at least one of the first lane segment or the second lane segment. The regulatory information may be determined using the map information 104. The regulatory information may be determined using the sensors 312.

The lane generation system 100 may generate the auxiliary segments 108 for some or all of the legally permissible movements through an intersection. In some situations, two of the auxiliary segments 108 may overlap each other. The overlap may be identified by the lane generation system 100, and can be used by a vehicle control system, such as the automated vehicle control system 316, as a basis for exercising yield control relative to another vehicle in an opposing one of the auxiliary lanes that overlaps the lane auxiliary lane that the vehicle is using.

Figure 9:
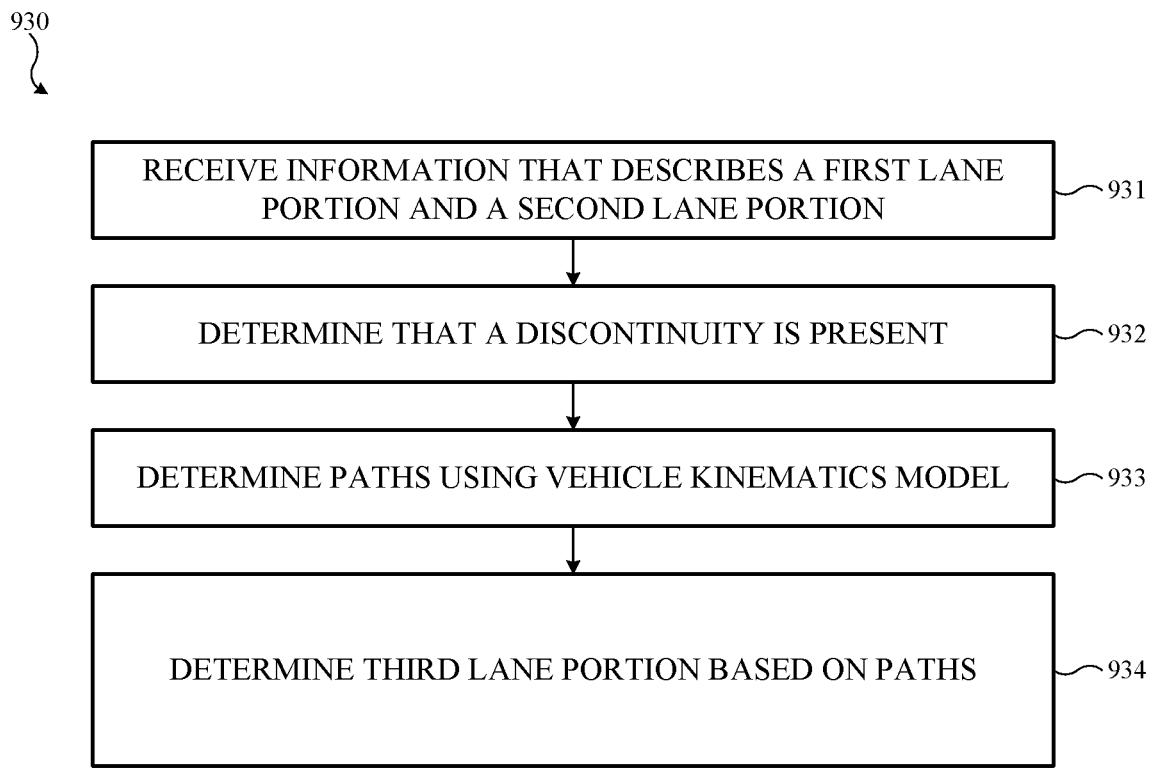
FIG. 9 is a flowchart that shows a process for lane generation according to a first example.

FIG. 9 is a flowchart that shows a process 930 for lane generation according to a first example. The process 930 may be implemented using a computing device. As one example, a computing device may include a processor, a memory, and computer-interpretable instructions that are stored in the memory and accessible to the processor, wherein the instructions, when executed by the processor, cause the processor to perform the operations of the process 930. In some implementations, the process 930 is implemented in the form of a computer readable storage device that includes computer-interpretable program instructions that cause operation of the process 930 when executed. In some implementations, the process 930 is implemented in the context of a vehicle that includes actuator systems that control motion of the vehicle and an automated control system that controls the actuators to move the vehicle between an origin and a destination using the outputs of the process 930.

Operation 931 includes receiving information that describes a first lane portion and a second lane portion, which may be individual lane segments from the lane segments 106. As examples, the information may be received by a transmission from a remote system, by a transmission from a local system (e.g., a process executed by the same computing device) by accessing the information from a storage device, or by obtaining the information from a sensor.

In some implementations, the information that describes the first lane portion and the second lane portion is received from stored mapping information, for example, as described with respect to the map information 104 and the map data store 210. In some implementations, the information that describes the first lane portion and the second lane portion is received by determining boundaries for the first lane portion and the second lane portion based on sensor outputs, for example, as described with respect to the sensors 312 and the machine vision based lane generator 314.

Operation 932 includes determining that a discontinuity is present between the first lane portion and the second lane portion. The presence of the discontinuity may be determined as previously described, such as by determining that a gap exists between the end of the first lane portion and the end of the second lane portion. Determining that a discontinuity is present between the first lane portion and the second lane portion may also include determining that a traversable relationship exists between the lane portions (e.g., it is legally permissible for a vehicle to travel from the first lane portion to the second lane portion). In one example, the discontinuity may be an intersection that is located between the first lane portion and the second lane portion. A third lane portion that is determined in the process 930 represents a travel path through the intersection.

Operation 933 includes determining one or more paths for a simulated vehicle from the first lane portion to the second lane portion using a vehicle kinematics model for the simulated vehicle. The one or more paths may be determined in the manner previously described, for example, by simulating movement of the vehicle from a starting location to an ending location across multiple steps as constrained by the vehicle kinematics model. In some implementations of operation 933 determining the one or more paths further comprises complying with a set of additional constraints, such as position constraints and comfort constraints.

Operation 934 includes determining a third lane portion based on the one or more paths from the first lane portion to the second lane portion such that the third lane portion defines a traversable route from the first lane portion to the second lane portion in accordance with the vehicle kinematics model. In some implementations, determining the third lane portion in operation 934 may include determining a vehicle area occupied by the simulated vehicle at multiple steps along each of the one or more paths and combining the vehicle areas for the multiple steps. In some implementations of operation 934, determining the third lane portion may include complying with a first positional constraint relative to the first lane portion and complying with a second positional constraint relative to the second lane portion. As an example, the first and second positional constraints may require that the simulated vehicle that is travelling from the first lane portion to the second lane portion be positioned in the first lane portion at its starting position, be positioned in the second lane portion at its ending position, and avoid crossing lateral boundaries of the first lane portion and the second lane portion.

In some implementations, the process 930 also includes identifying a classification for a nearby vehicle and selecting the vehicle kinematics model for the simulated vehicle in accordance with the classification. Identifying the classification for the nearby vehicle may include obtaining a sensor output. The presence of the nearby vehicle in the first lane portion can be determined using the sensor output. The sensor output is analyzed, for example, by the lane generator 102, to determine the classification for the nearby vehicle.

In some implementations, the outputs of the process 930 (e.g., the third lane portion in the form of a lane segment defined by polylines or another representation) are provided to an automated vehicle control system, such as the automated vehicle control system 316, in order to control operation of a vehicle, for example, by determination of actuator commands in dependence on the outputs from the process 930 and providing the actuator commands to actuator systems that are included in the vehicle.

Figure 10:
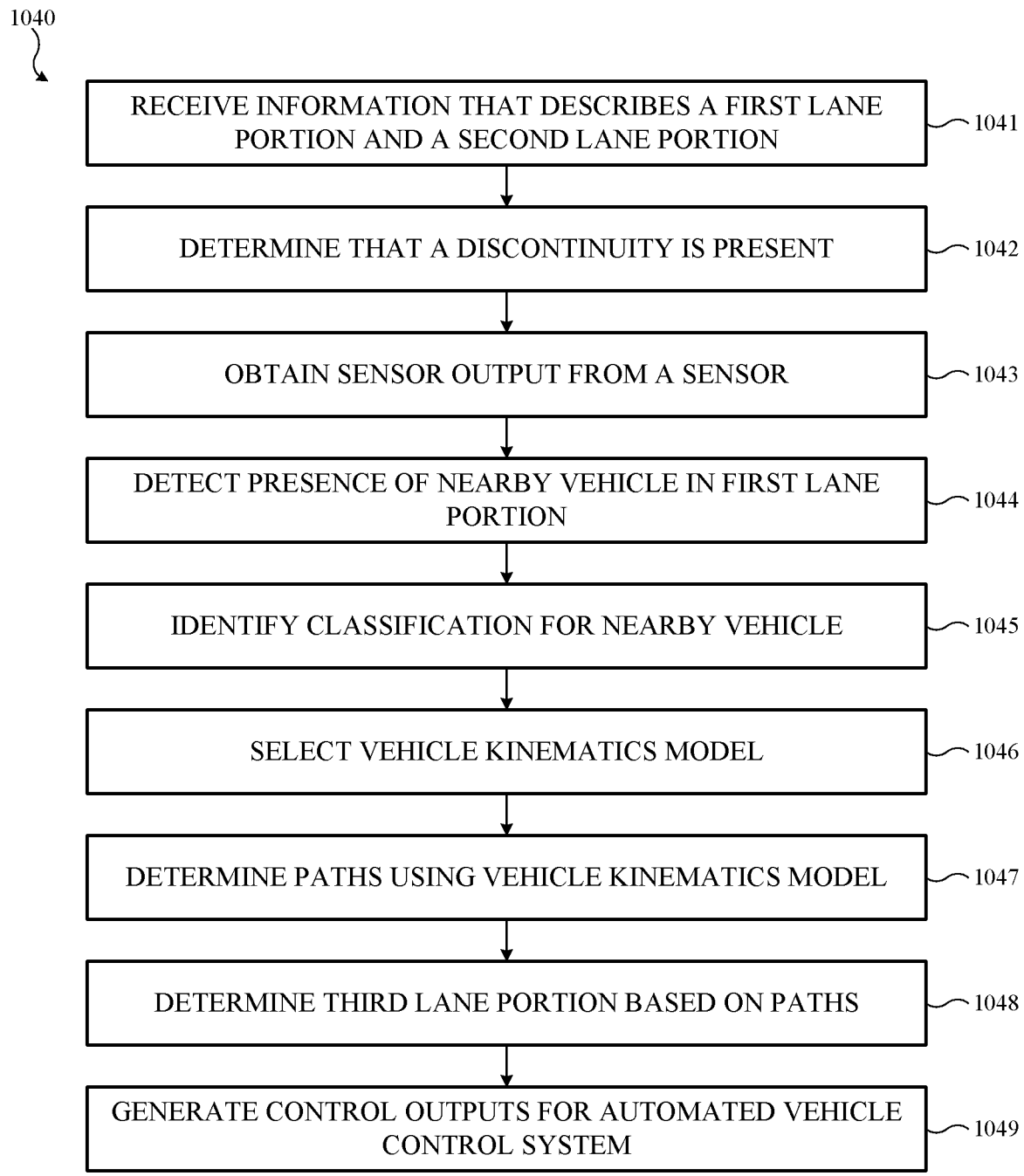
FIG. 10 is a flowchart that shows a process for lane generation according to a second example.

FIG. 10 is a flowchart that shows a process 1040 for lane generation according to a first example. The process 1040 may be implemented using a computing device. As one example, a computing device may include a processor, a memory, and computer-interpretable instructions that are stored in the memory and accessible to the processor, wherein the instructions, when executed by the processor, cause the processor to perform the operations of the process 1040. In some implementations, the process 1040 is implemented in the form of a computer readable storage device that includes computer-interpretable program instructions that cause operation of the process 1040 when executed. In some implementations, the process 1040 is implemented in the context of a vehicle that includes actuator systems that control motion of the vehicle and an automated control system that controls the actuators to move the vehicle between an origin and a destination using the outputs of the process 1040.

Operation 1041 includes receiving information that describes a first lane portion and a second lane portion, which may be individual lane segments from the lane segments 106. As examples, the information may be received by a transmission from a remote system, by a transmission from a local system (e.g., a process executed by the same computing device) by accessing the information from a storage device, or by obtaining the information from a sensor.

In some implementations, the information that describes the first lane portion and the second lane portion is received from stored mapping information, for example, as described with respect to the map information 104 and the map data store 210. In some implementations, the information that describes the first lane portion and the second lane portion is received by determining boundaries for the first lane portion and the second lane portion based on sensor outputs, for example, as described with respect to the sensors 312 and the machine vision based lane generator 314.

Operation 1042 includes determining that a discontinuity is present between the first lane portion and the second lane portion. The presence of the discontinuity may be determined as previously described, such as by determining that a gap exists between the end of the first lane portion and the end of the second lane portion. Determining that a discontinuity is present between the first lane portion and the second lane portion may also include determining that a traversable relationship exists between the lane portions (e.g., it is legally permissible for a vehicle to travel from the first lane portion to the second lane portion). In one example, the discontinuity may be an intersection that is located between the first lane portion and the second lane portion, and the third lane portion represents a travel path through the intersection.

Operation 1043 include obtaining a sensor output from a sensor. The sensor and its outputs may be implemented in accordance with the description of the sensors 312. Operation 1044 includes detecting presence of a nearby vehicle in the first lane portion using the sensor output. Presence of the nearby vehicle in the first lane portion may be detected by analyzing an output from the sensor (e.g., one or more video frames from a video camera) using machine vision techniques to identify the presence and location of the nearby vehicle according to known machine vision techniques.

Operation 1045 include identifying a classification for the nearby vehicle by analyzing the sensor output. The classification of the nearby vehicle may be determined in accordance with the description of the object classifier 418. As one example, the classification of the nearby vehicle may be determined by analyzing an output from the sensor (e.g., one or more video frames from a video camera) using machine vision techniques to identify the classification of the nearby vehicle according to known machine vision techniques.

Operation 1046 includes selecting a vehicle kinematics model for the nearby vehicle in accordance with the classification. The vehicle kinematics model may be selected, for example, from stored vehicle kinematics models that are predetermined and are associated with particular object classifications, such as by metadata that indicates that a specific vehicle kinematics model is suitable for use with vehicles of a particular classification.

Operation 1047 includes determining one or more paths for a simulated vehicle from the first lane portion to the second lane portion using the vehicle kinematics model. The one or more paths may be determined in the manner previously described, for example, by simulating movement of the vehicle from a starting location to an ending location across multiple steps as constrained by the vehicle kinematics model. In some implementations of operation 1047 determining the one or more paths further comprises complying with a set of additional constraints, such as position constraints and comfort constraints.

Operation 1048 includes determining a third lane portion based on the one or more paths from the first lane portion to the second lane portion such that the third lane portion defines a traversable route from the first lane portion to the second lane portion in accordance with the vehicle kinematics model. In some implementations, determining the third lane portion in operation 1048 may include determining a vehicle area occupied by the simulated vehicle at multiple steps along each of the one or more paths and combining the vehicle areas for the multiple steps. In some implementations of operation 1048, determining the third lane portion may include complying with a first positional constraint relative to the first lane portion and complying with a second positional constraint relative to the second lane portion.

Operation 1049 includes generating control outputs for an automated vehicle control system based in part on the third lane portion. Operation 1049 may be performed in accordance with the description of the automated vehicle control system 316.

Figure 11:
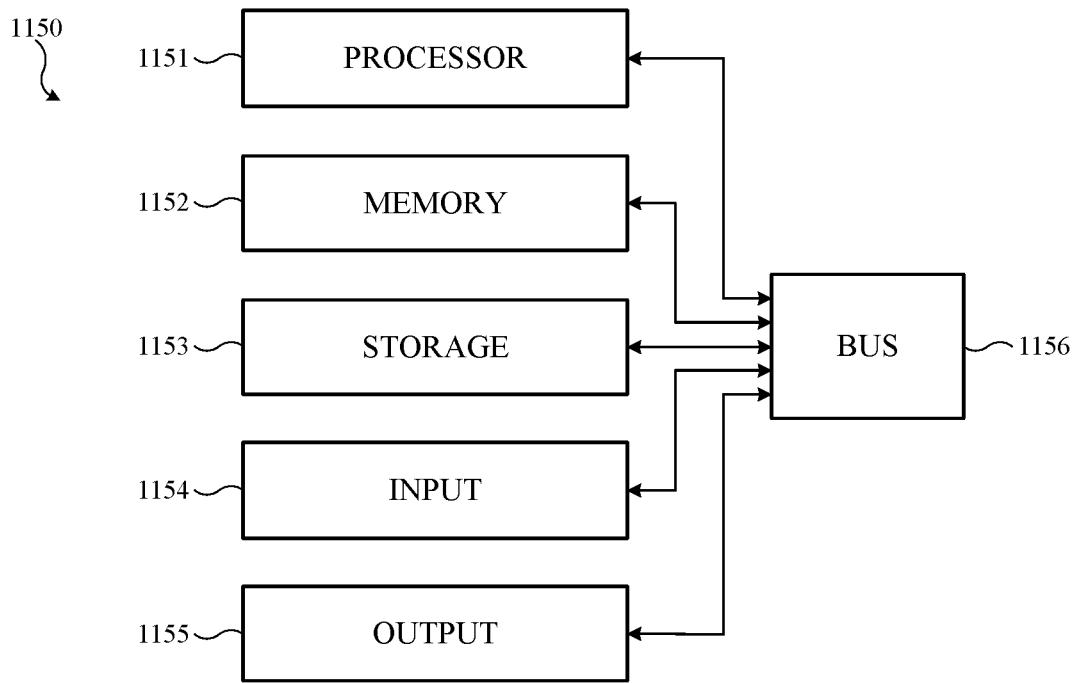
FIG. 11 is a block diagram that shows an example of a hardware configuration for a computing device.

FIG. 11 is a block diagram that shows an example of a hardware configuration for a computing device that can be used to implement the system described herein. The computing device 1150 may include a processor 1151, a memory 1152, a storage device 1153, one or more input devices 1154, and one or more output devices 1155. The computing device 1150 may include a bus 1156 or a similar device to interconnect the components for communication. The processor 1151 is operable to execute computer program instructions and perform operations described by the computer program instructions. As an example, the processor 1151 may be a conventional device such as a central processing unit. The memory 1152 may be a volatile, high-speed, short-term information storage device such as a random-access memory module. The storage device 1153 may be a non-volatile information storage device such as a hard drive or a solid-state drive. The input devices 1154 may include any type of human-machine interface such as buttons, switches, a keyboard, a mouse, a touchscreen input device, a gestural input device, or an audio input device. The output devices 1155 may include any type of device operable to provide an indication to a user regarding an operating state, such as a display screen or an audio output.

Figure 12:
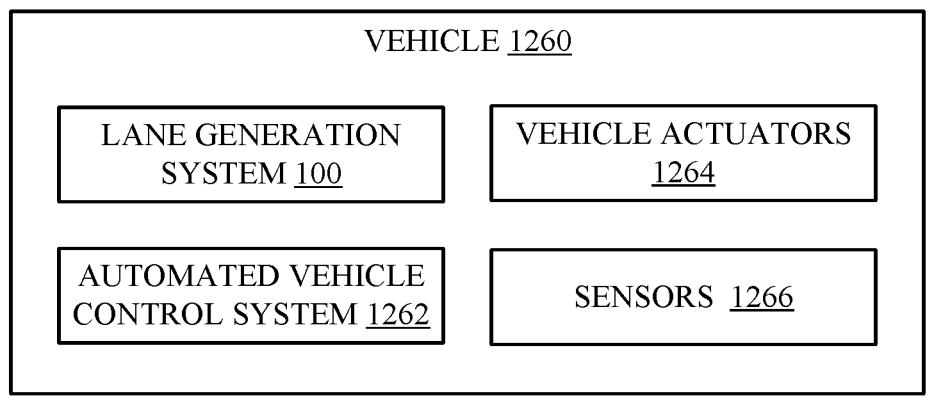
FIG. 12 is a block diagram that shows an example of a vehicle.

FIG. 12 is a block diagram that shows an example of a vehicle 1260. The systems and methods that are described herein may be implemented in the context of the vehicle 1260. In the illustrated example, the vehicle 1260 includes an automated vehicle control system 1262, vehicle actuators 1264, and sensors 1266. The automated vehicle control system 1262 may be implemented in accordance with the description of the automated vehicle control system 316. The vehicle actuators 1264 may include actuator system components that are typical of a road-going passenger vehicle, such as propulsion actuator system components, braking system actuator components, steering system actuator components, and suspension system actuator components. The sensors 1266 may include various sensors that collect information describing the surrounding environment. The sensors 1266 may be implemented in accordance with the description of the sensors 312. The vehicle 1260 also includes the lane generation system 100, which may use inputs from the sensors 1266 and provide outputs to the automated vehicle control system 1262 for use in determining commands for the vehicle actuators 1264.

As described above, one aspect of the present technology involves the use of map information and sensor information to generate lane information. For example, it is possible that the obtained information contains incidental images of other vehicles on the same road. As another example, it is possible for lane generation to accommodate for user preferences such as comfort settings which affect how aggressively a vehicle may turn.

The present disclosure contemplates that some users may consider the above-referenced information to be of a personal nature. Thus, entities responsible for the collection, analysis, disclosure, transfer, storage, or other use of such information data should comply with well-established privacy policies and/or privacy practices. In particular, such entities should implement and consistently use privacy policies and practices that are generally recognized as meeting or exceeding industry or governmental requirements for maintaining information data private and secure. Such policies should be easily accessible by users, and should be updated as the collection and/or use of data changes. The information should be collected for legitimate and reasonable uses of the entity and not shared or sold outside of those legitimate uses. Further, such collection/sharing should occur after receiving the informed consent of the users. In addition, policies and practices should be adapted for the particular types of information data being collected and/or accessed and adapted to applicable laws and standards, including jurisdiction-specific considerations. Different privacy practices may need to be maintained for different data types in each country.

Implementers of the present technology should consider implementations that allow users to select to "opt in" or "opt out" of participation in the collection of information data during registration for services or anytime thereafter. Also, as an example, users can select to limit the length of time the information is maintained by services that use the present technology. Implementers of the present technology should also manage said data in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., license plates), controlling the amount or specificity of data stored (e.g., collecting location data a city level rather than at an address level), controlling how data is stored (e.g., aggregating data across users), and/or other methods.

What is claimed is:
1. A vehicle, comprising:
an automated vehicle control system;
a sensor; and
a lane generator that is configured to:
receive information that describes a first lane portion and a second lane portion, determine that a discontinuity is present between the first lane portion and the second lane portion,
obtain a sensor output from the sensor,
detect presence of a nearby vehicle in the first lane portion using the sensor output,
identify a classification that describes a vehicle type for the nearby vehicle by analyzing the sensor output,
select a vehicle kinematics model for the nearby vehicle in accordance with the classification,
determine one or more paths for a simulated vehicle from the first lane portion to the second lane portion by simulating movement of the simulated vehicle from a starting location to an ending location across multiple steps by using the vehicle kinematics model to update a current state of the simulated vehicle at each of the multiple steps in response to a control input for the simulated vehicle at each of the multiple steps, and
determine a third lane portion based on the one or more paths from the first lane portion to the second lane portion such that the third lane portion defines a traversable route from the first lane portion to the second lane portion in accordance with the vehicle kinematics model,
wherein the automated vehicle control system is configured to generate control outputs based in part on the third lane portion.

2. The vehicle of claim 1, wherein the information that describes the first lane portion and the second lane portion is received from stored mapping information.

3. The vehicle of claim 1, wherein the information that describes the first lane portion and the second lane portion is received by determining boundaries for the first lane portion and the second lane portion based on sensor outputs.

4. The vehicle of claim 1, wherein determining the third lane portion includes determining a vehicle area occupied by the simulated vehicle at each of the multiple steps along each of the one or more paths and combining the vehicle areas for the multiple steps.

5. The vehicle of claim 1, wherein the vehicle kinematics model is selected from two or more stored vehicle kinematics models.

6. The vehicle of claim 1, wherein the lane generator is further configured to determine the one or more paths for the simulated vehicle by determining multiple paths for the simulated vehicle, wherein simulating movement of the simulated vehicle is performed using a cost function, and the cost function is changed for determination of each of the multiple paths.

7. The vehicle of claim 1, wherein the lane generator is further configured to determine the one or more paths for the simulated vehicle by determining multiple paths for the simulated vehicle.

8. A method, comprising:
receiving information that describes a first lane portion and a second lane portion;
determining that a discontinuity is present between the first lane portion and the second lane portion;
obtaining a sensor output from a sensor;
detecting presence of a nearby vehicle in the first lane portion using the sensor output;
identifying a classification that describes a vehicle type for the nearby vehicle by analyzing the sensor output;
selecting a vehicle kinematics model for the nearby vehicle in accordance with the classification;
determining one or more paths for a simulated vehicle from the first lane portion to the second lane portion by simulating movement of the simulated vehicle from a starting location to an ending location across multiple steps by using the vehicle kinematics model to update a current state of the simulated vehicle at each of the multiple steps in response to a control input for the simulated vehicle at each of the multiple steps;
determining a third lane portion based on the one or more paths from the first lane portion to the second lane portion such that the third lane portion defines a traversable route from the first lane portion to the second lane portion in accordance with the vehicle kinematics model; and
generating control outputs for an automated vehicle control system based in part on the third lane portion.

9. The method of claim 8, wherein the information that describes the first lane portion and the second lane portion is received from stored mapping information.

10. The method of claim 8, wherein the information that describes the first lane portion and the second lane portion is received by determining boundaries for the first lane portion and the second lane portion based on sensor outputs.

11. The method of claim 8, wherein determining the third lane portion includes determining a vehicle area occupied by the simulated vehicle at each of the multiple steps along each of the one or more paths and combining the vehicle areas for the multiple steps.

12. The method of claim 8, wherein the vehicle kinematics model is selected from two or more stored vehicle kinematics models.

13. The method of claim 8, wherein determining the one or more paths for the simulated vehicle includes determining multiple paths for the simulated vehicle.

14. The method of claim 8, wherein determining the one or more paths for the simulated vehicle includes determining multiple paths for the simulated vehicle, wherein simulating movement of the simulated vehicle is performed using a cost function, and the cost function is changed for determination of each of the multiple paths.

15. A non-transitory computer-readable storage device including program instructions executable by one or more processors that, when executed, cause the one or more processors to perform operations, the operations comprising:
receiving information that describes a first lane portion and a second lane portion;
determining that a discontinuity is present between the first lane portion and the second lane portion;
obtaining a sensor output from a sensor;
detecting presence of a nearby vehicle in the first lane portion using the sensor output;
identifying a classification that describes a vehicle type for the nearby vehicle by analyzing the sensor output;
selecting a vehicle kinematics model for the nearby vehicle in accordance with the classification;
determining one or more paths for a simulated vehicle from the first lane portion to the second lane portion by simulating movement of the simulated vehicle from a starting location to an ending location across multiple steps by using the vehicle kinematics model to update a current state of the simulated vehicle at each of the multiple steps in response to a control input for the simulated vehicle at each of the multiple steps;
determining a third lane portion based on the one or more paths from the first lane portion to the second lane portion such that the third lane portion defines a traversable route from the first lane portion to the second lane portion in accordance with the vehicle kinematics model; and generating control outputs for an automated vehicle control system based in part on the third lane portion.

16. The non-transitory computer-readable storage device of claim 15, wherein the information that describes the first lane portion and the second lane portion is received from stored mapping information.

17. The non-transitory computer-readable storage device of claim 15, wherein the information that describes the first lane portion and the second lane portion is received by determining boundaries for the first lane portion and the second lane portion based on sensor outputs.

18. The non-transitory computer-readable storage device of claim 15, wherein determining the third lane portion includes determining a vehicle area occupied by the simulated vehicle at multiple steps along each of the one or more paths and combining the vehicle areas for the multiple steps.

19. The non-transitory computer-readable storage device of claim 15, wherein the vehicle kinematics model is selected from two or more stored vehicle kinematics models.

20. The non-transitory computer-readable storage device of claim 15, wherein determining the one or more paths for the simulated vehicle includes determining multiple paths for the simulated vehicle.

21. The non-transitory computer-readable storage device of claim 15, wherein determining the one or more paths for the simulated vehicle includes determining multiple paths for the simulated vehicle, wherein simulating movement of the simulated vehicle is performed using a cost function, and the cost function is changed for determination of each of the multiple paths.

* * * * *